United States Patent [19]

Cooperman

[11] Patent Number: 5,784,487
[45] Date of Patent: Jul. 21, 1998

[54] SYSTEM FOR DOCUMENT LAYOUT ANALYSIS

[75] Inventor: Robert S. Cooperman, Somerville, Mass.

[73] Assignee: Xerox Corporation, Stamford, Conn.

[21] Appl. No.: 652,766

[22] Filed: May 23, 1996

[51] Int. Cl.⁶ ........................................ G06K 9/34
[52] U.S. Cl. .................... 382/175; 382/112; 707/521
[58] Field of Search ........................ 382/112, 321, 382/175; 395/779, 780–787, 805, 948; 345/195

[56] References Cited

U.S. PATENT DOCUMENTS

| | | | |
|---|---|---|---|
| 4,907,283 | 3/1990 | Tanaka et al. | 382/40 |
| 5,159,667 | 10/1992 | Borrey et al. | 395/761 |
| 5,197,122 | 3/1993 | Miyoshi et al. | 395/146 |
| 5,235,654 | 8/1993 | Anderson et al. | 382/61 |
| 5,363,480 | 11/1994 | Usami et al. | 395/145 |
| 5,418,864 | 5/1995 | Murdock et al. | 382/309 |
| 5,432,620 | 7/1995 | Watanabe et al. | 358/462 |
| 5,436,639 | 7/1995 | Arai et al. | 345/156 |
| 5,438,512 | 8/1995 | Mantha et al. | 364/419.1 |
| 5,465,304 | 11/1995 | Cullen et al. | 382/176 |
| 5,475,805 | 12/1995 | Murata | 395/144 |
| 5,485,566 | 1/1996 | Rahgozar | 395/148 |
| 5,555,362 | 9/1996 | Yamashita et al. | 395/779 |
| 5,631,984 | 5/1997 | Graf et al. | 382/317 |
| 5,634,021 | 5/1997 | Rosenberg et al. | 395/353 |
| 5,642,435 | 6/1997 | Loris | 382/229 |

OTHER PUBLICATIONS

*International Conference on Document Analysis and Recognition*; Oct. 20–22, 1993; "Document Image Segmentation and Text Area Ordering"; pp. 323–329.

Model Matching in Intelligent Document Understanding; Dr. Gary S. D. Farrow Prof. Costas S. Xydeas; and Dr. John P. Oakley; pp. 293–296.

Knowledge–Based Derivation of Document Logical Structure; Debashish Niyogi and Sargur N. Srihari; pp. 472–475.

A Knowledge–Based Approach to the Layout Analysis; Floriana Esposito, Donato Malerba, and Giovanni Semeraro; pp. 466–471.

Classification and Functional Decomposition of Business Documents; Suzanne Liebowitz Taylor, Mark Lipshutz, and Roslyn Weidner Nilson; pp. 563–566.

A Trainable, Single–pass Algorithm for Column Segmentation; Don Sylvester, and Sharad Seth; pp. 615–618.

*Primary Examiner*—Joseph Mancuso
*Assistant Examiner*—Jayanti K. Patel
*Attorney, Agent, or Firm*—Duane C. Basch

[57] ABSTRACT

The present invention is a system for providing information on the structure of a document page so as to complement the textual information provided in an optical character recognition system. The system employs a method that can be used to produce a file editable in a native word-processing environment from input data including the content and characteristics of regions of at least one page forming the document. The method includes the steps of: (a) identifying sections within the page; (b) identifying captions; (c) determining boundaries of at least one column on the page, and optionally (d) resizing at least one element of the page of the document so that all pages of the document are of a common size.

9 Claims, 7 Drawing Sheets

SYSTEM FOR DOCUMENT LAYOUT ANALYSIS

This invention relates generally to a document layout analysis component of an optical character recognition system, and more particularly to a system for providing information on the structure of a document page so as to complement the textual information provided in an optical character recognition system.

CROSS REFERENCE

The following related applications are hereby incorporated by reference for their teachings:

"A GRAPH-BASED TABLE RECOGNITION SYSTEM," Armon M. Rahgozar et al., application Ser. No. 08/585,142, filed Jan. 11, 1996; and "FONT ATTRIBUTABLE EXTRACTION BY STATISTICAL ANALYSIS", Zhigang Fan et al., application Ser. No. 08/369,440, filed Jan. 6, 1995.

COPYRIGHT NOTIFICATION

A portion of the disclosure of this patent document contains material which is subject to copyright protection. © Copyright Xerox Corporation, 1995, 1996. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is a system for providing information on the structure of a document page so as to complement the textual information provided in an optical character recognition system. It is known to employ optical character recognition to identify characters and words within a digitized document. As described by A. Rahgozar and R. Cooperman in application Ser. No. 08/585,142, filed Jan. 11, 1996, it is known to employ such systems to divide or segment a digitized document based upon the boundaries of the text, graphic or pictorial regions therein. Document layout analysis is a process by which the information regarding the organization of the document content, i.e. its structure, is extracted from the document image. The structure identifies document entity types (e.g. paragraphs, figures and tables), their properties (e.g. the number of columns in a table), and their interrelations (e.g., a figure is above a caption). Although Optical Character Recognition (OCR) is an inherent part of this process, it is not intended as an aspect of the present invention. The document layout analysis features include identifying the sections of a page, identifying regions of the document that represent captions to images or equivalent sections on a document page, the identification of column boundaries and techniques for employing such layout information to fit pages of differing sizes into a common document format. The present invention is directed to document layout analysis beyond a character level. Indeed, the methodology presented here is equivalently applicable to any of a number of document types so long as they may be represented as a digital image divided into segments or regions according to content.

Heretofore, a number of commercially available OCR products have disclosed techniques that make use of page segmentation, and then preserve only the size and location of the text regions. For example, Caere markets a product known as Omnipage that outputs text regions as frames. Other OCR products are known to be limited to identification of a single section per page of a document. The typical system does not preserve section structure, and text flow. However, some systems would preserve sections under specific circumstances, for example, where the columns in a section did not overlap one another.

In accordance with the present invention, there is provided a document layout analysis method for determining document structure data from input data including the content and characteristics of regions of at least one page forming the document, the method including the steps of: identifying sections within the page; identifying captions; and determining boundaries of at least one column on the page One aspect of the invention deals with a basic problem in optical character recognition systems—that of preserving detail of the input document in addition to the characters represented thereon. In particular, the present system is directed to a layout analysis system and can be used to extend the capability of an OCR package to recreate a close approximation of a document being scanned. Specifically, the system produces output data for a word processor that preserves both editability and a close approximation of the original appearance. The output further includes document structure details to preserve the original appearance while producing an editable document. It also can improve the text ordering capabilities of an OCR package and to recreate the structure of a document that was converted to a format that does not retain that structure, such as ASCII text.

This aspect is further based on the discovery of a technique that alleviates the problem in traditional OCR systems. The technique provides information to supplement that generated by traditional OCR processes. The technique employs neural net-based training to optimize the process by which the document structure is defined. Moreover, the us of neural net techniques is computationally intensive and therefore the present system further employs pre-processing operations to identify when a neural net approach is advantageous.

The technique described above is advantageous because it can be adapted to is provide document layout data for any document processed by a system employing the techniques. The techniques of the invention are advantageous because they extend the capability of an OCR system, to being able to closely approximate a document in a word processing environment, essentially enabling editability while preserving the document's original appearance. Some of the techniques can be used to provide page structure information, thereby improving the text ordering capability of the OCR system Other techniques can be further applied so as to modify the "scale" of components making up the page so that the output document is produced with a consistent page size.

Figure 1:
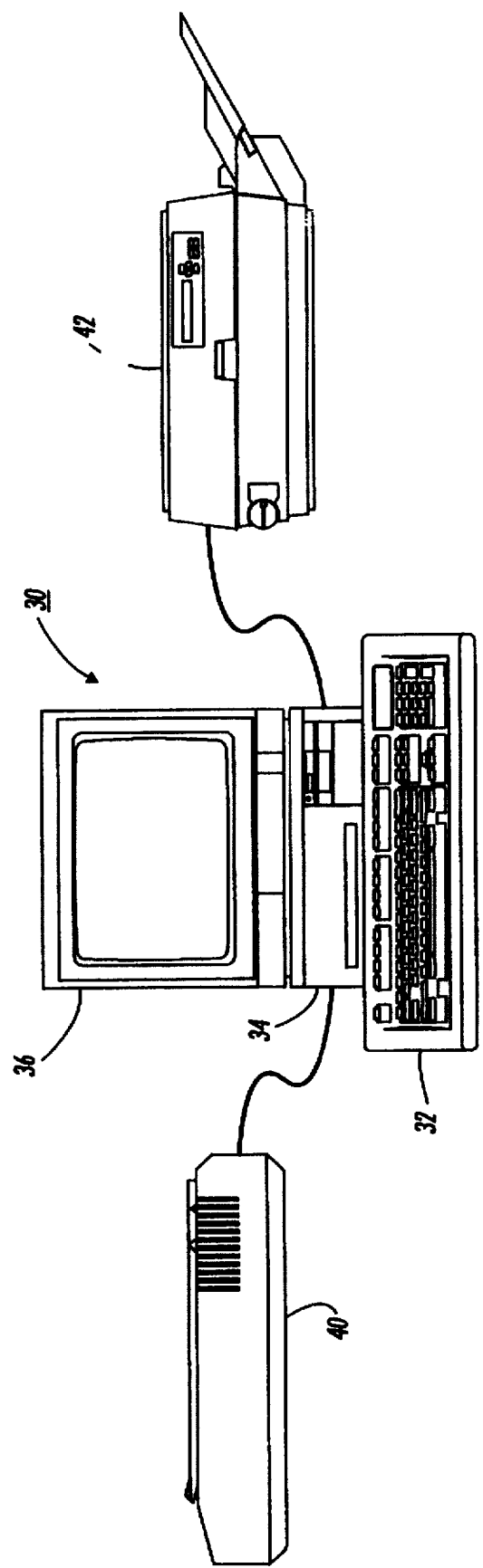
FIG. 1 is a general diagram of a personal computer or data processing system that provides an embodiment for various aspects of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values.

The term "data" includes data existing in any physical form, and includes data that are transitory or are being stored or transmitted. For example, data could exist as electromagnetic or other transmitted signals or as signals stored in electronic, magnetic, or other form.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

"Character" means a discrete element that appears in a written or printed form of a language. Characters in the English language can thus include not only alphabetic and numerical elements, but also punctuation marks, diacritical marks, mathematical and logical symbols, and other elements used in written or printed lo English. More generally, characters can include, in addition to alphanumeric elements, phonetic, ideographic, or pictographic elements.

A "character type" is a category of which a character may be an instance, such as the letter "a" or the number "3".

A "character recognition system" is a system that can operate on an item of data defining characteristics of a character other than its character type to obtain an item of data indicating its character type.

A "word" is a set of one or more characters that is treated as a semantic unit in a language. "Text" is an arrangement of one or more lines of characters; the characters of a text may form words.

A "page" is a portion of a document, wherein the portion may be properly characterized as printed or printable information that may be rendered on a single sheet of the output medium. As used herein, the term "page" is not only applied to hard copy substrate sheets, but to corresponding electronic representations of such sheets. The electronic representations may be produced by one or more image input terminals, for example, a digital scanner. A "document" consists of one or more "pages"

A "region" is a portion of a page identified by a boundary be it visible or invisible. The boundary may have a regular rectangular shape or an irregular shape. The boundaries of two regions may overlap, meaning that the bounding boxes about regions may share common borders, but that the pixels within a bounding box are uniquely associated with a region defined by a bounding box. A "section" is a portion or region of a page that contains a particular number of columns, of particular widths and distances from the left margin. The flow of text does not continue from one section, to another, on the same page. For example, adding more text to a section will generally increase the height of that section in a word processor. This definition is believed to be consistent with the capabilities of certain word processors.

As used herein, "textual" regions of a page image are those regions containing alphanumeric or similar symbols, wherein the symbols form units of semantic understanding. Conversely, "non-text" or "picture" regions are those regions of a page image having little or no textual content, typically content that is pictorial or graphic in nature. Non-text regions include, for example, halftoned images, continuous tone images, tables, line drawings, clip-art.

A "table" as used herein is intended to refer to textual data arranged in a regular structure so as to generally have a plurality of rows and columns. A "caption" is a textual region associated with a non-text region such as a picture, wherein the text generally includes descriptive information associated with the picture.

An "image input device" or "image input terminal" (IIT) is a device that can receive an image and provide an item of data defining a version of the image. A "scanner" is an image input device that receives an image by a scanning operation, such as by scanning a hard copy document.

An "image output device" of "image output terminal" (IOT) is a device that can receive an item of data defining an image and provide the image as output. A "display" is an image output device that provides the output image in human viewable form. The visible pattern presented by a display is a "displayed image" or simply "image."

Turning now to FIG. 1, the present invention finds particular use in image scanning systems that have the capability for optical character recognition. Although directed to aspects of an optical character recognition engine, a preferred embodiment for the present invention is a desktop data processing system having the capability for receiving digitized input. As shown in FIG. 1, such a system could include a computer workstation 30, including a keyboard 32, a display (monitor) 36 and a system unit 34. The workstation preferably includes a Windows™-compatible personal computer equipped with an Intel™ or compatible 80486 or Pentium™ microprocessor, a VGA, SVGA or Multisync color monitor, eight megabytes of RAM, eight to sixteen megabytes of permanent virtual memory, Microsoft Windows™ 95 or Windows NT operating system, and a minimum of nine megabytes free hard disk space. In addition, the data processing system preferably includes an image input terminal 40 for producing a digitized representation of a hard copy document. Alternatively, the digitized image source may be a disk or similar storage device for recording encoded image files, including fax-modem systems. Data processing system 30 may further include a printer 42 to render printed output of data produced, stored or otherwise made available via the data processing system. It will be appreciated by those skilled in the art that various aspects of data processing system 30 may be remotely located and that the functionality of such a system may be enabled via a network or similar communication links between various components of the system.

Figure 2:
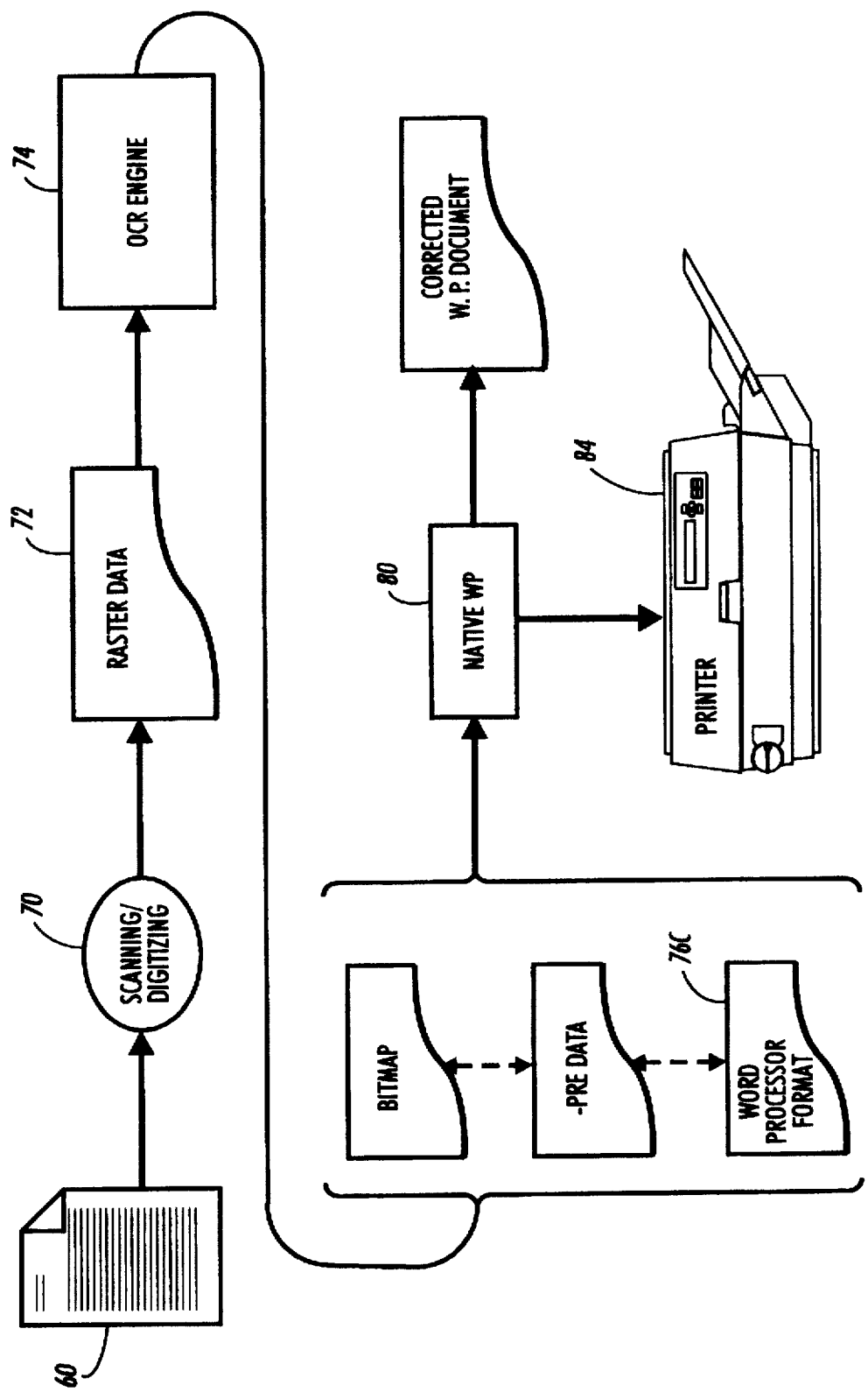
FIG. 2 is a data flow diagram depicting the flow of information in accordance with an aspect of the present invention.

Considering FIG. 2 in conjunction with FIG. 1, the general operation of an optical character recognition system will be described. It is to be understood that a preferred embodiment for the present invention is a computer workstation or data processing system similar to that illustrated in FIG. 1. Accordingly, various aspects of the present invention are implemented in software that controls the operation of a data processing system. FIG. 2 represents the data flow from a hard copy document 60 to a word processing document 62.

Initially, hard copy document 60 is placed or otherwise presented to image input terminal 40, where it is scanned or digitized as represented by operation 70 of FIG. 2. The output of the digitization process is rasterized data, reference numeral 72. The rasterized data is preferably in the form of an array of image data, for example a bitmap such as a Tag Image File Format (TIFF) formatted file or an equivalent graphics file format. After digitization, the raster data 72 is passed to an optical character recognition (OCR) engine 74, where it is processed in accordance with OCR techniques described herein. In a preferred embodiment, the OCR engine is the engine found in the Xerox TextBridge® Pro 96 or TextBridge® Pro 3.03 OCR software. In general, the OCR engine operates to identify characters and characteristics for each of a plurality of words identified within the raster data. Output of the OCR engine comprises a number of files, including files 76a, 76b and 76c. File 76a preferably provides a means by which the document may be viewed on display 36 (FIG. 1) or in conjunction with a data searching tool. File 76c comprises data including descriptions of characters, fonts, and locations on the page and may be in a format readable by the native word processing system 80.

The system described herein for document layout analysis uses information, produced by an OCR engine as inputs. In a preferred embodiment, the OCR engine 74 would divide or segment each page into regions, each region preferably consisting essentially of elements of a common type or context (e.g., text or graphic/non-text (drawing, pictorial)). Further details of the manner in which such systems may segment a document page are described by Rahgozar et al. in U.S. patent application Ser. No. 08/585,142 or by Mahoney in U.S. patent application Ser. Nos. 08/563,479 and 08/565,181, filed Nov. 28, 1995, the relevant portions of which are hereby incorporated by reference. The resulting text regions can be as large as a column, or as small as a paragraph. The underlying requirement being that a correct reading order for a page, and likewise a determination of headers, footers, and captions, can be accomplished by arranging the text regions identified. Accordingly, in the input provided by the OCR recognition process, each non-text region should correspond to one graphic (picture) region. The document layout analysis system described herein may work adequately, even with some errors introduced by a page segmentation system.

For each region or segment identified within a particular page of the document, the following information is understood to be provided:

1) A description of each region as either text, graphic (e.g., picture, drawing, etc.), ruling, timestamp, or table cell;

2) The coordinates of the region's bounding box in absolute distance from either the scanned edge or the hard copy document's edge; and 3) For text regions, font information comprising: (a) the most common font, (b) the font size, (c) the font style (e.g., regular, bold, italic, fixed pitch, etc.), and (d) the number of lines of text within the region.

In response to the above inputs and in accordance with the present invention, the document layout analysis system preferably provides the following outputs:

1) An identification of headers and footers within the document;

2) A positional classification of headers and footers (e.g., left, right, or centered);

3) An identification of captions, including an indication of the non-text region the caption is associated with;

4) The reading order of text regions;

5) An identification of cell tables, including rows and columns;

6) A grouping of text regions into sections and a sub-grouping of regions into text columns; and 7) Data on the width of columns and the number of columns within each section.

Having generally described the inputs and outputs of a document layout analysis system in accordance with the present invention, attention is now turned to the operation of such a system. The overall program flow of the document layout analysis system is depicted beginning with FIG. 3. In particular, FIG. 3 is a flow chart generally illustrating various upper level steps executed to produce the output of the document layout analysis system—information sufficient to recreate a close approximation of an original document so that the information may be employed to produce a word processing formatted file 76c (FIG. 2) that is editable and bears a close approximation to the appearance of the original document.

Figure 3:
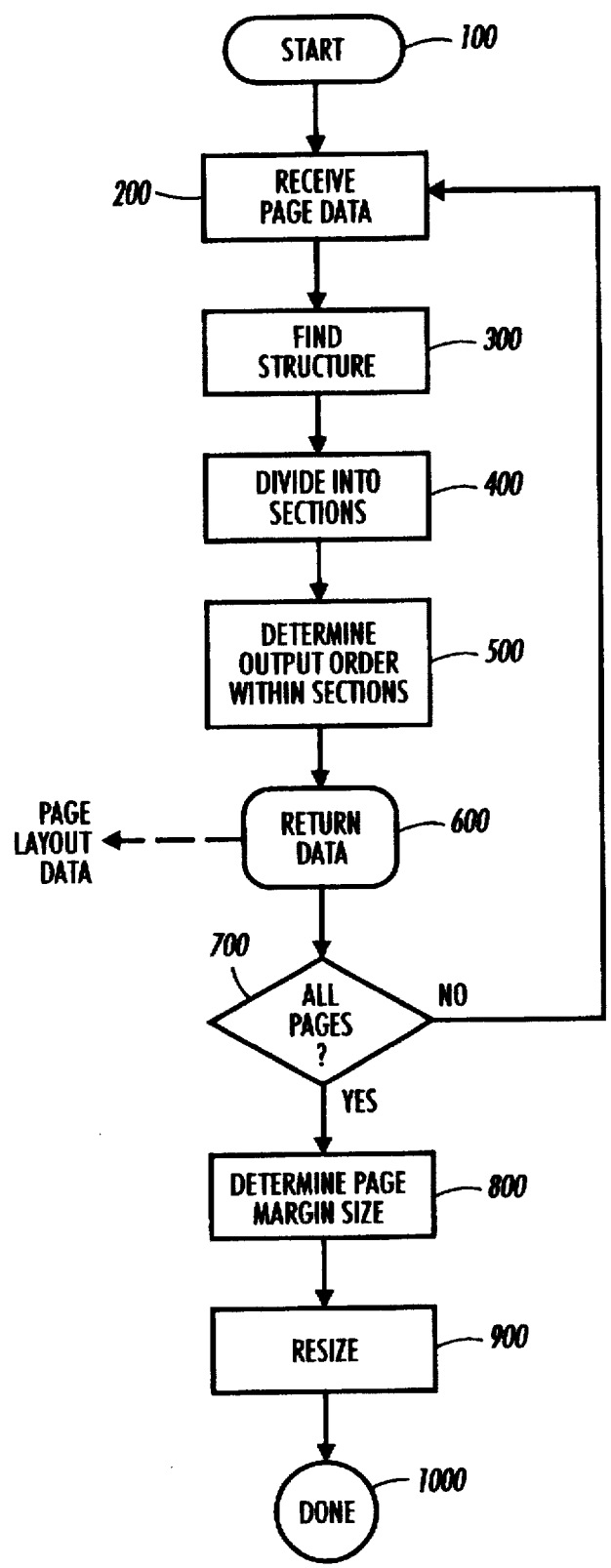
FIGS. 3–7 are flowcharts illustrating various aspects of the operation of the document analysis system in accordance with the present invention.
Figure 4:
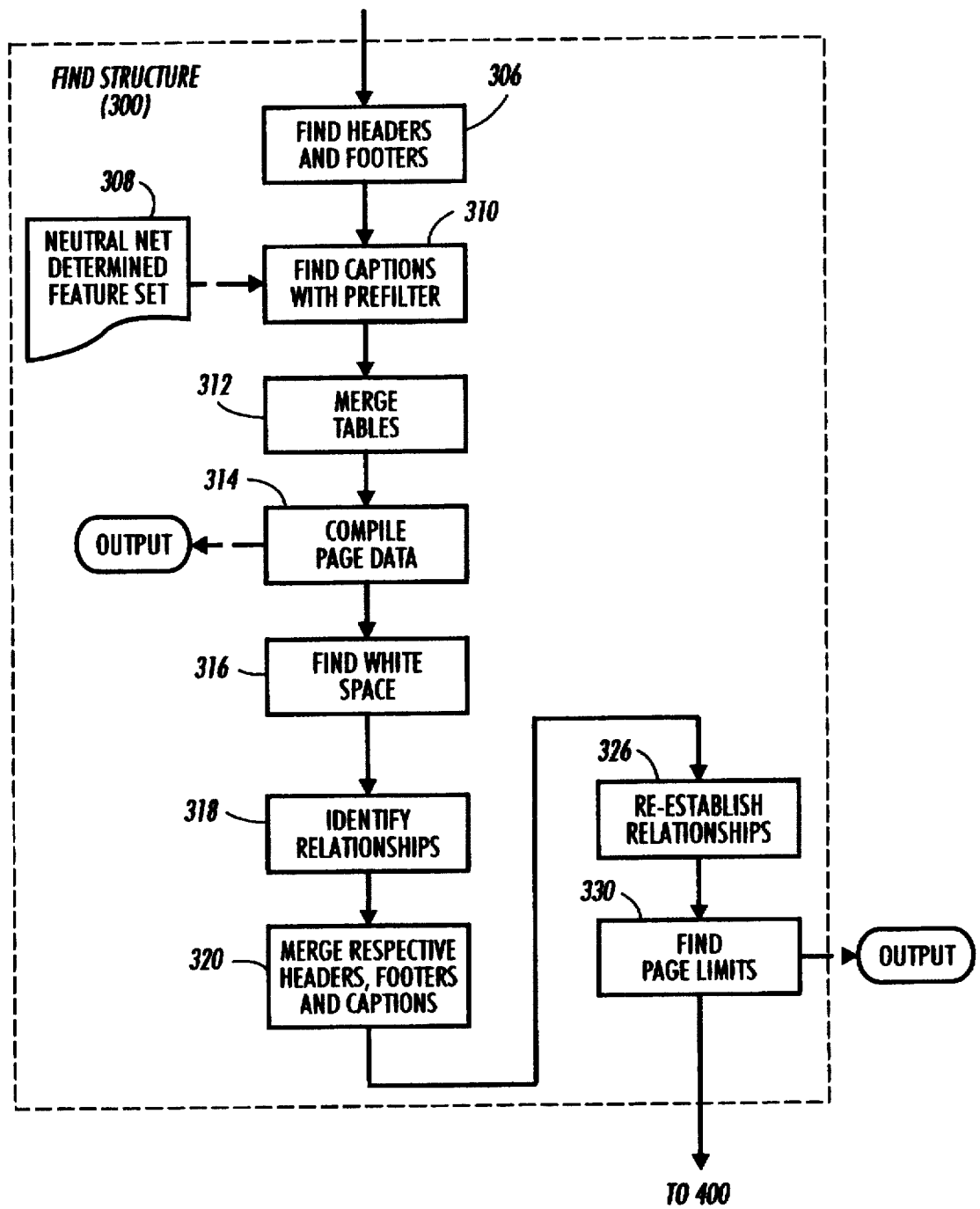

Referring to FIG. 3, the process begins at step 100 where the document layout analysis system is invoked or otherwise started, preferably by a call to execute instructions as are generally described hereafter. At step 200, the document layout analysis system, operating on a data processing system characterized above, receives page data. As described, the page data includes information that segments various regions of image data into regions of similar context in a deskewed orientation. As systems to accomplish are well understood by those skilled in the art including, for example, any of number of TextBridge OCR software products. Once the data is received, the system then seeks to find or identify the structure of a page at step 300, where the page is represented by the data received in step 200. Further details will be provided on the various processing steps within the general find structure operations of step 300.

Once the structure is identified, the page may be divided into sections as represented by step 400. As further described with respect to FIG. 5, the section division operations employ various sub-operations to identify divisions or breaks on the page, and then to apply a series of rules so as to properly characterize such breaks to form sections. After the sections are identified, the text regions therein are further processed in order to determine the output or reading order of the various segments or regions within the sections, step 500. For example, if a section includes a picture and a caption, the output order will indicate where the caption is to be placed so that it appears in the same position when the page data is later accessed in a word-processing environment. At step 600, the data for a particular page is returned or otherwise temporarily stored on memory operatively connected to or inserted in a memory device that forms part of the data processing system.

Step 700 tests to determine if all of a plural number of pages forming the document have been analyzed in accordance with steps 100–500 and the data stored as described in step 600. If not, processing continues at step 200 for subsequent pages of the document. Otherwise, processing continues at step 800, where page margins are characterized based upon the individual page information previously obtained and stored. Once accomplished, various regions or pages within the document may be resized so as to provide a document with consistently appearing pages. It will be appreciated that the advantages arising from the resizing operation of step 900 are wide ranging—allowing a user to avoid having to reformat, or more specifically resize, various features of the document within a word processing environment. Once the optional resizing operation is accomplished, the document layout analysis operations are completed and control is returned to the aspects of the OCR system that invoked the document layout analysis.

Having described the general operation of the document layout analysis system, attention is now turned to FIGS. 4–7, where further details of various operations are described in detail. Considering FIG. 4, displayed therein are the various sub-operations or steps performed to find the structure of the page based upon data supplied to the document layout analysis system. Initially, as represented by step 306, the headers, footers. Step 306 preferably includes a two-pass approach to identifying segments as headers and footers. In the first pass, the data for each section is considered, with particular attention being paid to: (a) whether there are any text regions above (header) or below (footer) the section under consideration, (b) the height of the region or section under consideration, (c) the number of text lines in the region, (d) the distance of the region from the edge of the image (or document), and (e) the prevalent font size of the text in the region, relative to the font size of other regions on the page. Based upon this information, certain of the regions within the page are eliminated from further consideration as headers or footers.

Having reduced the set of possible header and footer regions the second pass is carried out. In the second pass, the data for each of the regions is again analyzed, this time comparing those regions considered as possible headers or footers with those regions eliminated during the first pass. In particular, the analysis determines how close to the top or bottom the regions found and eliminated as headers or footers in the first pass were. Recognizing that headers or footers, do not stick out too much from other headers or footers, but should be separated from text regions, in the absence of segmentation errors, the system tests to identify the most likely candidates for headers and footers.

More specifically, there are certain characteristics of headers and footers. Namely, the height of the region is limited to a specific size (determined by comparison to a predetermined height parameter); there are no text regions lying above a header or below a footer; the number of lines in the header or footer in excess of one line reduces the likelihood of a header/footer; when the font size is greater than a predefined font size (or one based upon a predominant font size) the likelihood of header/footer is reduced. In operation, these characteristics are employed to identify candidate headers and footers. Subsequently, the set of candidate text regions is further narrowed by imposing the constraint that, other than timestamps, no text region that isn't a header (footer) should be above (below) or on the same line as the header (footer) candidate. The text regions meeting the described characteristics are identified as headers or footers, and if no candidates meet the criteria, then no headers or footers are found for the page.

Having identified headers and footers, processing continues at step 310 where the captions are identified. In a preferred embodiment, a neural network analysis approach is applied to identify the captions and associate them with a proper region of the page. As will be appreciated by those skilled in the art of digital computers, neural networks may be employed where automatic training or learning methods can be implemented. The present invention preferably relies on the nature of captions (typically a textual associated with another non-text region of the page or document) and a set of training documents or samples to identify a set of features that are indicative of a caption. It will also be appreciated that the application of a neural network may be a computationally intensive operation. Thus, the present invention employs neural network techniques to a limited set of caption candidates in order to reduce the computation intensity. Once prefiltered using a subset of the caption indicating features, the remaining caption candidates are analyzed using an algorithm developed using neural network techniques.

Having described the object and background of the find captions step, attention is now turned to the set of features that are employed to identify captions. Using a set of test documents or samples, a neural network was used to identify those features 308 most likely to provide an indication of a region being a caption. The features analyzed by the neural network algorithm include:

centering relationship—how centered is the text region with respect to the non-text region in the direction it faces. This is found by an algorithm that can be described briefly as follows:

1. Find which of the 4 sides of the picture, the text region faces, by finding the center point of each, T and P. Tx is the x location of the center of Text, Py is the y location of "picture" (pict) center, etc. if ((Ty<Py) and ((Py–Ty)>ABS (Tx–Px))), then text is above pict; else if ((Ty>Py) and ((Ty–Py)>ABS (Tx–Px))), then text is below pict; else if (Tx<Px), then text is left of pict; else text if right of pict.
2. if the text is above or below the pict as defined in step 1, and if ABS (Tx–Px)<=(ParameterA * Width of Picture), then text is centered about picture; if the text is right or left of the pict as defined in step 1, and if ABS (Ty–Py)<=(ParameterA * Height of Picture), then text is centered about picture. Note: "ABS" is the Absolute Value function; "*" is the multiplication operator; and "/" is the division operator.

projection overlap—how much is the projection of the text overlapped with respect to non-text region in the direction it faces it;

italic—prevalent font in text region italic?;

bold—prevalent font in text region bold?;

font style difference—prevalent font style in text region different than majority of remaining text (e.g., Courier, when most of the text regions are Times Roman);

font size—prevalent font in text region point size in absolute terms?

font size difference—point size of prevalent font in text region compared to an average point size of other regions on page?;

distance to end—distance of side of text that faces away from non-text region to the non-text region;

distance to beginning—distance between the side of text that faces toward the non-text region to the non-text region;

intervening text—any other text between caption candidate and non-text region?;

text position—is the text directly below the non-text region?;

text blocking—is there text both directly above and below text region, not blocked by the non-text region.;

aspect ratio of text—the ratio of the height of a bounding box to its width, where the bounding box is the smallest rectangle that would enclose all of the text in a region alignment—how close do sides of text and non-text regions line up;

caption location—which direction is text from non-text region (e.g., left, right, top, bottom, etc.);

The details of the neural net employed to process the feature data does not form a specific aspect of the present invention. Rather, it is the feature set and the use of such features for training that is intended as an aspect of the present invention. Furthermore, as will be appreciated from a review of the features described above, some of the features are themselves algorithms.

As previously noted, the preferred embodiment for the present invention employs a prefiltering operation within the find captions step 310. The pre-filtering algorithm is used to increase the throughput of the neural net, by only using the neural net for likely caption candidates. The prefiltering is accomplished using size characteristics of the non-text and text regions, and the respective distances between the regions. The following pseudocode provides an indication of the features (e.g., separation distance between candidate text and non-text region, and the relative size of the candidate and non-text regions) used to accomplish the prefiltering operation as part of step 310.

if (((distance between pict and text)<=ParameterB)
AND ((Height of Text)<=ParameterC)
AND (((Height of Text) * Width of Text)<=ParameterD)),
then run neural network to determine if this text is a caption of this picture It will be appreciated by those skilled in the art of computer programming and page layout analysis that the parameters noted herein are preferably empirically determined based upon a set of "typical" documents or, alternatively, that the parameters may be user definable so as to be tailored to a user's particular needs.

Once prefiltered, the remaining candidates for caption regions are analyzed using the neural network developed algorithm for comparison of all features. The goal is to determine whether a particular text region is a caption of a picture or similar non-text region. For example, each of the input variable are computed on a normalized basis, meaning that each input variable is computed so that it has a range of −1 to +1 if floating point numbers are used, and −127 to +128 if not. True/False conditions would be mapped to −1 to +1, while the aspect ratio might be mapped so that 1/5 is mapped to −1 and 5/1 is mapped to +1 and all values out of range are set to −1 or +1. For example, using floating point numbers the neural net algorithm produced as a C program fragment, preferably created using a neural network design tool such as NeuralWorks™ Professional from Neural-Ware™ is as follows:

Xout[54] = (float)(2.3604465) + (float)(−.89965802) * Xout[15] +
    (float)(−0.034137126) * Xout[16] + (float)(−.34651124) * Xout[27] +
    (float)(−1.3930738) * Xout[28] + (float)(.78716421) * Xout[29] +
    (float)(.64415783) * Xout[30] + (float)(.42871949) * Xout[31] +
    (float)(0.010794017) * Xout[32] + (float)(−.18771964) * Xout[33] +
    (float)(−1.2003322) * Xout[34] + (float)(−0.041160159) * Xout[35] +
    (float)(−1.5538942) * Xout[36] + (float)(−.28576005) * Xout[37] +
    (float)(−1.8140048) * Xout[38] + (float)(−0.014208515) * Xout[39] +
    (float)(0.0058387369) * Xout[40] + (float)(0.018672444) * Xout[41] +
    (float)(−.98806441) * Xout[42] + (float)(0.041963357) * Xout[43] +
    (float)(0.087391928) * Xout[44] + (float)(−0.025030114) * Xout[45] +

-continued
    (float)(0.0055547366) * Xout[46] + (float)(−.10101365) * Xout[47] +
    (float)(0.064058997) * Xout[48] + (float)(−.21652491) * Xout[49] +
    (float)(−.13399157) * Xout[50] + (float)(.63396114) * Xout[51] +
    (float)(−1.3797814) * Xout[52] + (float)(−1.7381424) * Xout[53]}

Xout[54] = tanh(Xout[54]);

where Xout[NN] reflects one of the features specified above and where each of the floating point numbers was empirically derived from training. In a one layer neural net, this could be the output, and if Xout[54]>0, then it is a caption. In a two layer neural net there might be 16 similar equations with different values, which themselves are added in a statement very much like the statement above.

As noted above, in a system that does not have floating point processing the neural net analysis may be accomplished using an integer notation system. In a system having inputs to the first layer and four elements, each of the elements was an integer. For example, element 1 was equivalent to:

Element1 = tanh (((I1 * ParameterI1) + ParameterII1) +
    ((I2 * ParameterI2) + ParameterII2) +
        ((I3 * ParameterI3) + ParameterII3) . . . );

where I1 represents feature 1, I2 feature 2, etc.
The output was:

if (tanh (((Element1 * ParameterJ1) + ParameterJJ1) +
    + ((Element2 * ParameterJ2) + ParameterJJ2) +
        ((Element3 * ParameterJ3) + ParameterJJ3) +
            ((Element4 * ParameterJ4) + ParameterJJ4)) > 0), then it is a caption After the operations described above in pseudocode have been completed, the resulting information indicates those text regions that are highly likely to be captions for non-text regions and an association therebetween. It will be appreciated that numerous data structures can be employed to represent the association of a now identified caption text region with a non-text region including, for example, a table or linked list.

Having completed the identification and association of captions in step 310, processing continues at step 312, where those non-text regions identified as table are merged in accordance with the teachings of Rahgozar et al. as reflected in U.S. application Ser. No. 08/585,142, previously incorporated by reference. After merging the tables, the structure finding operation 300 continues at step 314, where the overall page data is compiled. In particular, this step includes: (a) looking at the bounding box of every region on the page, and finding the topmost, bottommost, leftmost, and rightmost extents of the text and non-text regions on the page; (b) looking at the font data for each of the text regions of the page to compile averages for font height; and (c) determining whether most of the page (i.e., more than a percentage is in a fixed pitch font, italic, or bold, respectively, Parameter's E F and G. Averages can be calculated by counting each region's most common font equally, or by compiling statistics based on each individual letter's font information. A preferred embodiment would be to weight each letter equally.

Having compiled the page data, the system then finds white space to the left and right sides of the text regions to help establish relationships between regions that are above and below one another as depicted by step 316. White space to the R or L of a text region is sometimes a part of a region as an indents. Next, the system attempts to further identify relationships between regions, step 318, and in particular identifies those regions located above other regions. It will be appreciated that as a result of the merging operations accomplished in step 320, it may be necessary to redefine relationships between the regions. Depending upon the particular mode of the document analysis output, recomposition (providing an accurate rendition of the input document) or stream output (accurate reading order) the operation performed at step 320 may be impacted. For example, in recomposition each page may contain a header and/or a footer that is positioned horizontally at the left, center or right third of the page. The merging operation in this situation is accomplished by finding midpoints of the header or footer and determining whether it lies in the in first, middle or last vertical third of the page. If there is more than one header or footer in any category, then they are merged to preserve line relationships. On the other hand, for stream output, all headers are merged together and all footers are merged together. Captions are also treated in step 320 for both the recomposition and stream cases, where if more than one caption is in the same quadrant about a non-text region, then the captions are merged together. Alternatively, it may be better to merge only those captions having no other non-caption text regions between them. As indicated by step 326 relative positioning is employed to re-establish relationships of text regions that are not headers, footers and captions. After the relationships are redefined, the borders or limits of the textual regions of the page may be identified as indicated by step 330. The page limits are identified by calculating the limits of text regions of a page that are not headers and footers and can be used to further define page sizes. Once completed, the page structure data has been obtained and processing continues at block 400 as indicated in FIG. 3.

Figure 5:
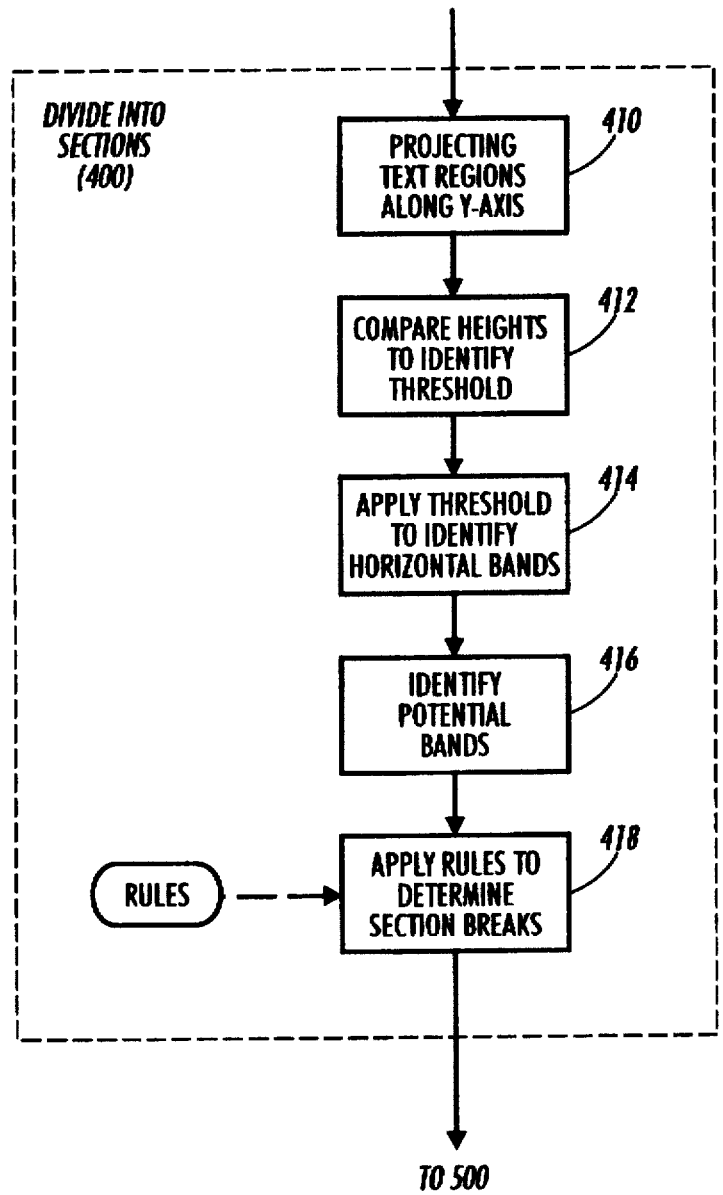

As indicated generally by step 400, the page is subsequently able to be divided into sections using the structure identified in step 300. Referring now to FIG. 5, displayed therein is a detailed flowchart of the operations or steps employed in the present invention to divide the page into sections. In particular, step 410 begins the process by projecting all textual regions on the page against a y-axis. The result of this step, is an indication of the heights of the white space between the textual elements. At step 412, the heights are compared so as to identify a threshold height. Once determined, the threshold height is employed to identify those white space bands below the threshold height, step 414, and to indicate such white space bands as ones that could divide a page into sections.

Once possible horizontal bands are identified, the text regions closest to the bottoms and tops of each of these potential bands are identified, step 416. Then, a set of rules is applied at step 418 to compare the number and widths of these text regions and determine which of these bands or gaps are in actuality section breaks. The section breaks may then be employed to divide the page (and document) into sections.

The following multi-step algorithm represents the operations employed to identify section breaks. It will be appreciated that the preferred embodiment for this algorithm is on a deskewed page—preferably accomplished in conjunction with the segmentation operations of step 300.

1. Get the set of all text regions on the page;
2. Remove from that set, pictures (non-text regions) likely to be scanner noise, (e.g., if (Picture height>ParameterR) then it is removed from this list);
3. For each region in the remaining set, use the top and bottom values, to fill in which parts of the Y direction of the page is in use.
4. For all values of Y not used by any text region, find contiguous areas where height>ParameterS (Note: these areas are the initial horizontal band list);
5. Remove any horizontal band that doesn't have a text region both above it and below it.
6. Consider each area between horizontal bands as being a temporary text section; and
7. For each remaining horizontal bands:
    Count the number of columns in the section above and in the section below. That is the number of text regions in the section above, that do not have any text region directly below in the same section, and likewise the number of text regions in the section below, that do not have any other text region directly above, in the same section.
    TextA is considered to be above TextB, for this purpose, if the bottom of TextB is below the bottom of TextA, and the narrower of TextA and TextB shares ParameterT percent of its x values with the other.
    if there is a horizontal ruling between the sections then keep this gutter.
    else if there are two cols. above and 1 below then
        if the rightmost above column is above the col. below then remove this gutter.
        else keep this gutter
    else if there is one column both above and below remove this gutter
    else if there are the same number of columns above and below
        if each column above lines up with the one below ("lines up with" meaning that the left edge of ColumnA is within ParameterU×distance of the left edge of ColumnB, and the same for right edge with right edge) then remove this gutter
        else keep this gutter
    else if each column in both sections, either lines up with a column in the other, or is above or below a picture in the other then remove this gutter
    else keep this gutter
8. The remaining horizontal bands define the sections.

Although not specifically illustrated in FIG. 3, subsequent to dividing the page into sections (step 400) it may be desirable to merge horizontal regions (e.g., bulleted items) and columns. More specifically, very narrow (one line) text regions to the left of a wide region are assumed to be bullet items and combined with that region, which is presumably the paragraph the bullet (*, graphic, or one word) is attached to.

Figure 6:
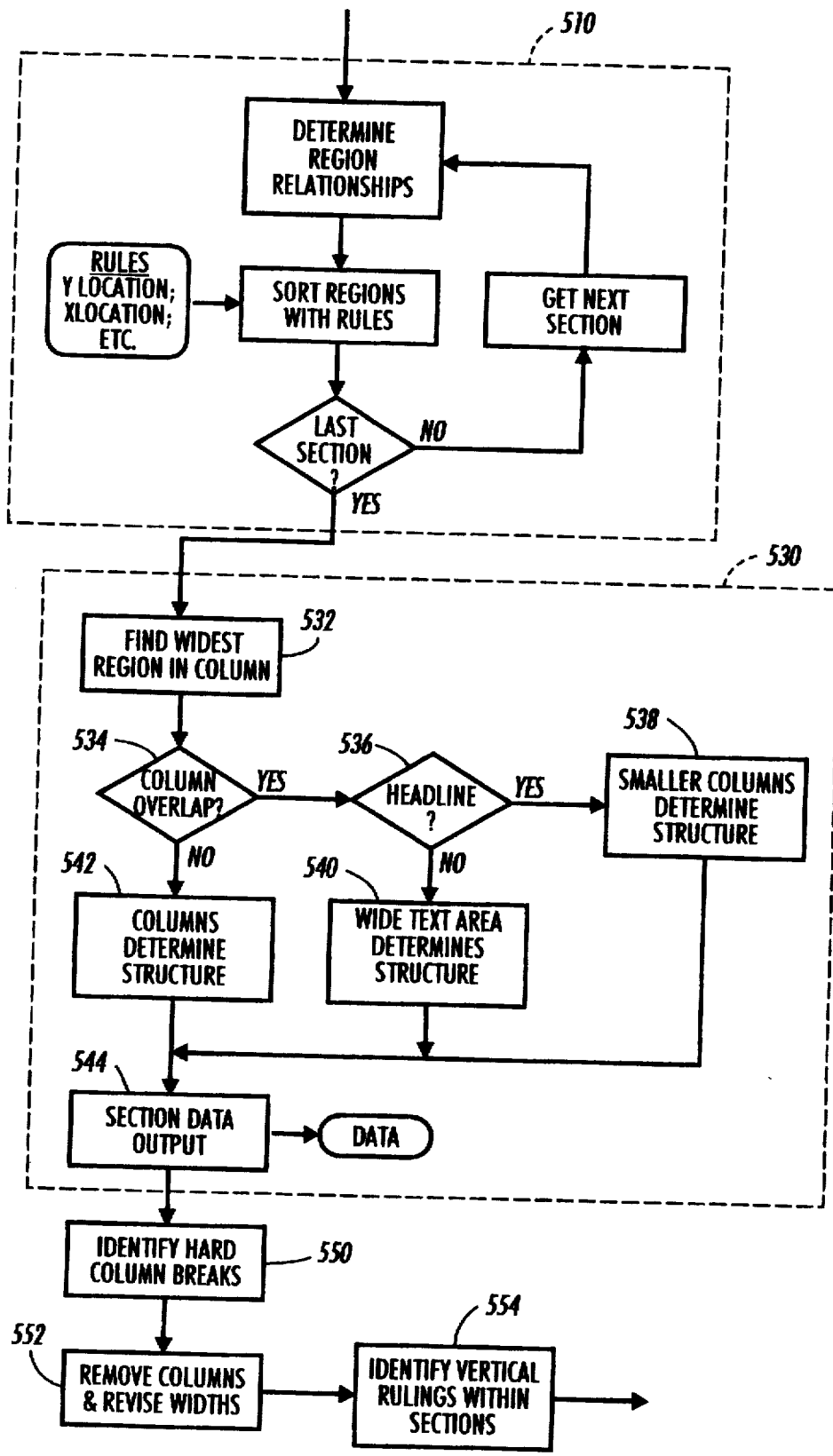

Having now divided the page into sections, the reading order of the page, and ultimately the document, may be determined by determining the output order in each section. Referring to FIG. 6, displayed therein is a detailed flowchart of the steps generally indicated by step 500 of FIG. 3. In particular, step 500 includes a step 510 for identifying the output or reading order within a particular section, this step being repeated for each section within the page. Reading order is found within each section based upon constraints imposed by regions, where regions falling below other regions are deemed to be later in the reading order. Similarly, the horizontal or x-order determines reading order, with the exception that items whose top is a certain distance below the other's top are placed later in the reading order, even if the section is located is to the left (e.g., a smaller x-axis value). The following pseudocode represents the operations to find center points for text regions T1 and T2:

if ((T1x * ParameterH)+T1y)>((T2x * ParameterH)+ T2y), then T1 is after T2 in reading order.

After identifying the reading order within the various sections, the document layout analysis system collects section information as indicated generally by step 530. A section contains a particular number of columns, of particular widths and distances from the left margin. The flow of text does not continue from one section, to another, on the same page. For each section, after a reading order is determined (step 510), the widest region in each column is determined, step 532, and whether it overlaps other columns, step 534. If there is overlap, as indicated by an affirmative result to step 534, it is determined whether the wide region is likely to be a headline at step 536. The test is accomplished in a preferred embodiment, where Tfont defines the most common font for the region T, so that text region T is a headline if one or more of the following conditions are met:

Tfont is >=ParameterJ font height;

Tfont is >=(ParameterK * average font height for the page);

Tfont is bold while the rest of the page is not mostly bold (as applied for the page data steps above); or Aspect Ratio of Text <=ParameterL, where Parameter(I,J,K) are preferably empirically determined parameters that are based upon measurement or observation of a set of typical document or, alternatively, are user defined values that may be established during operation of the document analysis system.

An affirmative result to test step 536 causes step 538 to use the smaller columns to determine the column structure. A negative response to test step 536 indicates a wide text area, in which case it determines the column structure for the section as indicated by step 540. It will be appreciated that for minor cases of overlaps, although not shown, the difference is split and column left and right edge locations that leave a minimum distance between them are determined.

The overall result, step 544, is for each section, a description of how many columns the section has, the column widths and the left and right edge locations for the column, even where the original page had a layout too complex to represent in such a manner. The advantage of such output is that it allows an OCR system to retain both the overall appearance, and the editability of the documents in word processors that can use such descriptions.

Once the sections are identified within the document, they are further analyzed, as indicated by step 550 (FIG. 6) to identify hard column breaks. Essentially, this step utilizes data indicating the end of the last column and the bottom of the section to determine the column breaks. Generally, a column ending above ParameterZ distance from the bottom of its section, where there is no picture or caption in the space, indicates a hard column break. Subsequently, as represented by step 552, column structures identified in step 550 that do not fit on the available page are removed and then any column widths that might change as a result are modified. In other words, the column that may be removed in step 552 is only the column structure, the text regions within the column are not removed, but will be associated with a neighboring column that was not removed. Subsequently, at step 554, the system identifies whether the section is best described as containing vertical rulings or not. The first step is identifying vertical rulings is a part of the step. Once identified, the area between columns for a section is further analyzed to determine if the identified vertical rulings cover a predetermined portion of the height of the section. If so, and if a predetermined portion of the total number of columns in the section minus one (Number Columns–1) contain such rulings, then the section is identified or described as containing vertical rulings. Alternatively if (MAX (1, Number Columns–A)) contain such rulings, then the section is identified as having vertical rulings.

Having identified the vertical rulings with a section, the document layout analysis continues by identifying cell tables within sections, and once done, the cells (text regions) are ordered in accordance with their position in the table (not shown). In particular, a list of all cell edges is made for the x and y coordinates thereof. The list is then analyzed to determine which of the cell edges lie along a common edge (within a tolerance) in order to identify rows and columns within the table. Subsequently, once the cells are placed into rows/columns that define the table grid, a test is preferably conducted to assure that no two cells occupy a common grid coordinate (table row, table column). Having assigned the cells to particular grid coordinates, the reading order of the cells may be defined by reading across each successive row of the table to produce the output in a digital format that can be transferred to a word processing system as reflected by the return data step 600 illustrated in FIG. 3.

Figure 7:
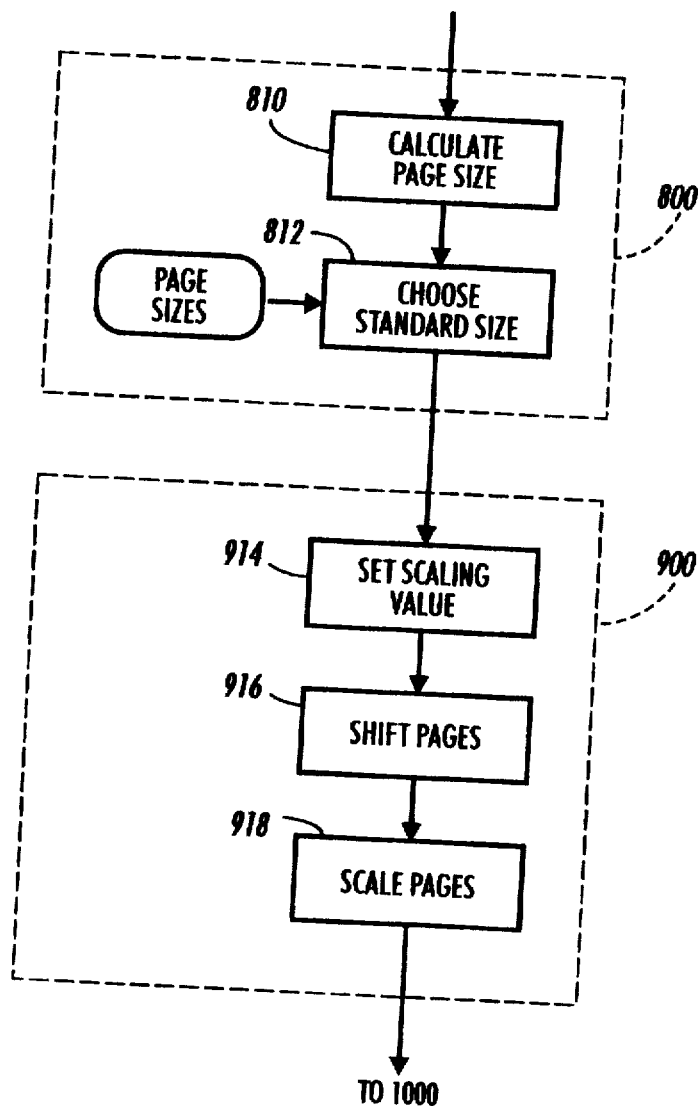

Referring next to FIG. 7, displayed therein is additional detail of the operations performed in steps 800 and 900 FIG. 3. After all pages of the document have been analyzed as described above, step 810 calculates the horizontal and vertical size of each page using a bounding box incorporating all pictures and text therein. It will be appreciated that this operation is preferably performed separately for portrait and landscape pages, the results being the largest pages sizes found in the document. Given a set of possible standard page sizes, a choice is made at step 812 as to which standard size page to use. Standard page sizes are the expected page size available on the output device (e.g., printer) that a user is likely to use. For a general purpose OCR product, the default sizes are likely to be 8.5×11 inches for US or A4 (210 mm×297 mm) for all others. Alternatively, additional pages sizes could be available, for example, 11×14 Inches or A3.

As reflected by general step 900, once chosen, step 914 determines a scaling value for the entire document. Then, each page's contents are then shifted to be in a standard configuration, such as top-left or center of the page at step 916 and the size and location of every element on the page, including font sizes, are multiplied by the scaling value, step 918. More specifically, a global scaling factor is calculated as a percent value to multiply all distances, including font sizes. Since the system deals with one page at a time, none of these document wide values are available when information about each page is recorded. Therefore, original values for margins, need to be recalculated.

The steps-illustrated accomplish the following for each page:

---

(a) Multiply every distance that is offset from a left margin as follows,
NewValue = ((OldValue * ScalingFactor) + 50)/100;
(b) Multiply each font ptsize value by the scaling factor,
NewPtSizeValue = (OldPtsizeValue * ScalingFactor)/100;
(c) Multiply page margins by the scaling factor as follows,
if ((scaled page picture with text bounding box left edge)
  <(document left margin of portrait or landscape))
  XPageShiftingFactor = (document left margin of portrait or landscape)
  −(scaled page picture plus text bounding box left edge);
else if ((scaled @dc picture with text bounding box right edge)
  >(document right margin ot portrait or landscape))
  XPageShiftingFactor = (document right margin of portrait or -continued

```
landscape);
        —(scaled @dc picture with text bounding box right edge)
        else
            XPageShiftingFactor = 0;
        if ((scaled @dc picture with text bounding box top edge)
            <(document top margin of portrait or landscape))
            YPageShiftingFactor = (document top margin of portrait or
landscape)
        —(scaled page picture plus text bounding box top edge);
    else if ((scaled @dc PICTURE ONLY bounding box bottom edge)
        >(document bottom margin of portrait or landscape))
        YPageShiftingFactor = (document bottom margin of portrait or
landscape);
        —(scaled @dc PICTURE ONLY bounding box bottom edge)
        else
            YPageShiftingFactor = 0;
(d) For those values that are relative to the edge of the bitmap:
Multiply by ScalingFactor; and
Add X or YPageShiftingFactor;
(e) For those values that are relative to the bounding box of the page:
Multiply by ScalingFactor;
Add scaled Bounding Box Value; and
Add X or YPageShiftingFactor;
```

The advantages of the present scaling operation over a simple analog or bitmap reduction, are that the OCR system can handle each page individually. The overall scaling factor would not be known until all pages are processed. That processing includes finding a bounding box that includes all pictures and text that are not noise for each page. Processing pages individually reduces memory requirements and processing time.

In recapitulation, the present invention is a system for providing information on the structure of a document page so as to complement the textual information provided in an optical character recognition system. The system employs a method that produces a file editable in a native word-processing environment from input data including the content and characteristics of regions of at least one page forming the document. The method includes the steps of: (a) identifying sections within the page; (b) identifying captions; (c) determining boundaries of at least one column on the page, and optionally (d) resizing at least one element of the page of the document so that all pages of the document are of a common size.

It is, therefore, apparent that there has been provided, in accordance with the present invention, a method and apparatus for page layout analysis, including a method for determining sections on a page, a method for determining captions, a method for determining column boundaries in a complex page, and a method for fitting pages of different sizes into one document.

While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A document layout analysis method for determining document structure data from input data including the content and characteristics of regions of at least one page forming the document, the method including the steps of:
    identifying particular types of sections within the page, wherein the step of identifying sections within the page further comprises the steps of
        identifying rows and columns within a table,
        Identifying headers and footers on a page, and
        classifying the headers and footers based upon a horizontal location;
    identifying captions, wherein the step of identifying captions further comprises identifying an association between a non-text region of the page and the caption identified; and
    determining boundaries of at least one column on the page, wherein the step of determining boundaries of at least one column on the page further comprises the steps of
        identification of text regions,
        grouping of text regions on the page into sections,
        grouping of the text regions within a section into the at least one column,
        determining a column width for the at least one column on the page, and
        determining, using the column width, the number of columns in each section.

2. The method of claim 1, wherein the input data represents at least two different pages of a document and said pages are of different sizes and where the method further includes the step of resizing at least one element of the page of the document so that all pages of the document are of a common size.

3. The method of claim 1, wherein the step of identifying captions further comprises:
    training a neural net with a predefined set of features;
    employing a trained neural net to generate an algorithm based upon the predefined set of features; and
    applying the algorithm generated by the neural net to the input data to identify text regions determined to be captions.

4. The method of claim 3, wherein the predefined set of features includes a subset of features selected from the set including:
    centering relationship;
    projection overlap;
    italic;
    bold;
    font style difference;
    font size;
    font size difference;
    distance to end;
    distance to beginning;
    intervening text;
    text position;
    text blocking;
    aspect ratio of text;
    alignment; and
    caption location.

5. The method of claim 3, wherein the step of applying the neural net to the input data includes the step of prefiltering the text regions so as to only apply the neural net to likely caption candidates, where said prefiltering step eliminates text regions that are caption candidates based upon
    a relative size of the text region that is a caption candidate when compared to the non-text region; and
    the distance between the caption candidate and the non-text region.

6. The method of claim 5, wherein the prefiltering step includes:
    comparing an area of a caption candidate with an area of the non-text region to produce an aspect ratio indicative of the area of the caption candidate relative to the non-text area; and eliminating the caption candidate from further processing by the neural net whenever the aspect ratio exceeds a predefined threshold.

7. A document analysis method comprising the steps of:

digitizing, using an image input terminal, a document to produce rasterized data representing the document;

processing the rasterized data representing the document with a character recognition engine, wherein the character recognition engine operates to identify characters and characteristics for each of a plurality of words identified within the rasterized data, and where output of the character recognition engine includes descriptions of characters, fonts, and locations on a page of the document; and determining document structure data from output of the character recognition engine including the content and characteristics of regions of at least one page forming the document, said step of determining document structure data including the steps of identifying sections within the page, wherein the step of identifying sections within the page further comprises the steps of
- identifying rows and columns within a table,
- Identifying headers and footers on a page, and
- classifying the headers and footers based upon a horizontal location.

identifying captions, wherein the step of identifying captions further comprises the steps of
- training a neural net with a predefined set of features,
- employing a trained neural net to generate an algorithm based upon the predefined set of features, and
- applying the algorithm generated by the neural net to the input data to identify text regions determined to be captions; and determining boundaries of at least one column on the page, wherein the step of determining boundaries further comprises the steps of
- identification of text regions,
- grouping of text regions on the page into sections,
- grouping of the text regions within a section into the at least one column,
- determining a column width for the at least one column on the page, and
- determining, using the column width, the number of columns in each section.

8. The method of claim 7, wherein the step of identifying captions further comprises:
- training a neural net with a predefined set of features;
- employing a trained neural net to generate an algorithm based upon the predefined set of features; and
- applying the algorithm generated by the neural net to the input data to identify text regions determined to be captions.

9. The method of claim 8, wherein the step of applying the neural net to the input data includes the step of prefiltering the text regions so as to only apply the neural net to likely caption candidates, where said prefiltering step eliminates text regions that are caption candidates based upon
- a relative size of the text region that is a caption candidate when compared to the non-text region; and
- the distance between the caption candidate and the non-text region.

* * * * *